United States Patent
Xiang

(10) Patent No.: US 11,614,912 B2
(45) Date of Patent: Mar. 28, 2023

(54) DUAL-SYSTEM DEVICE AND WRITING METHOD AND APPARATUS THEREOF, AND INTERACTIVE INTELLIGENT TABLET

(71) Applicants: GUANGZHOU SHIYUAN ELECTRONICS CO., LTD., Guangdong (CN); GUANGZHOU SHIZHEN INFORMATION TECHNOLOGY CO., LTD., Guangdong (CN)

(72) Inventor: Tao Xiang, Guangdong (CN)

(73) Assignees: GUANGZHOU SHIYUAN ELECTRONICS CO., LTD., Guangdong (CN); GUANGZHOU SHIZHEN INFORMATION TECHNOLOGY CO., LTD., Guangdong (CN)

( * ) Notice: Subject to any disclaimer, the term of this patent is extended or adjusted under 35 U.S.C. 154(b) by 133 days.

(21) Appl. No.: 17/119,219

(22) Filed: Dec. 11, 2020

(65) Prior Publication Data
US 2021/0096806 A1  Apr. 1, 2021

Related U.S. Application Data

(63) Continuation of application No. PCT/CN2018/112715, filed on Oct. 30, 2018.

(51) Int. Cl.
*G06F 3/04883* (2022.01)
*G06F 3/14* (2006.01)
(Continued)

(52) U.S. Cl.
CPC ........ *G06F 3/1454* (2013.01); *G06F 3/04883* (2013.01); *G06F 9/451* (2018.02);
(Continued)

(58) Field of Classification Search
CPC .... G06F 3/1454; G06F 9/451; G06F 3/04883; G06F 2203/04804; G09G 5/08; G09G 2320/0252; G09G 2352/00
See application file for complete search history.

(56) References Cited

U.S. PATENT DOCUMENTS

| | | | | |
|---|---|---|---|---|
| 2016/0004375 A1* | 1/2016 | Xiong | ................ | G06F 3/04184 345/173 |
| 2016/0334984 A1 | 11/2016 | Ikeda et al. | | |
| 2018/0136822 A1* | 5/2018 | Seibert | ................ | G06F 3/04883 |

FOREIGN PATENT DOCUMENTS

| | | |
|---|---|---|
| CN | 104932814 A | 9/2015 |
| CN | 106095294 A | 11/2016 |

(Continued)

OTHER PUBLICATIONS

International Application No. PCT/CN2018/112715, International Search Report and Written Opinion dated Mar. 19, 2019, 11 pages.

*Primary Examiner* — Robert J Michaud
(74) *Attorney, Agent, or Firm* — Zhong Law, LLC

(57) ABSTRACT

A dual-system device and writing method and apparatus thereof, and interactive intelligent tablet includes a first system and a second system receiving touch data, where the data rendering speed of the first system is faster than that of the second system, and the data processing speed of the second system is faster than that of the first system; the first system acquiring data to be rendered from a target storage area, where the data to be rendered is generated by the second system according to the touch data and stored in the target storage area; the first system rendering the data to be rendered to obtain handwriting data to be displayed, and transmitting the handwriting data to be displayed to a display screen of the dual-system device for display. The
(Continued)

disclosure solves the technical problem of writing delay of an external system when using dual-system to perform writing.

14 Claims, 6 Drawing Sheets

(51) Int. Cl.
 *G06F 9/451* (2018.01)
 *G09G 5/08* (2006.01)
(52) U.S. Cl.
 CPC ..... *G06F 2203/04804* (2013.01); *G09G 5/08* (2013.01); *G09G 2320/0252* (2013.01); *G09G 2352/00* (2013.01)

(56) References Cited

FOREIGN PATENT DOCUMENTS

| | | | |
|---|---|---|---|
| CN | 107003908 A | 8/2017 | |
| CN | 107422974 A | 12/2017 | |
| CN | 107450831 A | 12/2017 | |

\* cited by examiner

DUAL-SYSTEM DEVICE AND WRITING METHOD AND APPARATUS THEREOF, AND INTERACTIVE INTELLIGENT TABLET

CROSS-REFERENCE TO RELATED APPLICATIONS

This application is a continuation of International Application No. PCT/CN2018/112715 filed on Oct. 30, 2018, which claims priority to Chinese Patent Application No. 201810622600.X filed on Jun. 15, 2018, both of which are hereby incorporated by reference in their entireties.

FIELD OF THE INVENTION

The invention relates to the technical field of computers, and in particular relates to a dual-system device and its writing method, apparatus and an interactive intelligent tablet.

BACKGROUND OF THE INVENTION

For a dual-system device, there is a main system provided by the device itself and other systems accessed through interfaces. Taking an Android TV as an example, in addition to an Android module, the device also provides HDMI/VGA interfaces and the like, and these interfaces can be used to display the frames of Windows/Android/Mac OS/Linux and other systems in the sense that Android TV provides display channels to other systems that support frame output of the HDMI or other formats for display. In such scenario, the screen of Android TV can display frames of two systems, including the frame of Android TV system and the frame of external channels such as an HDMI channel. When there are hollow (transparent) areas in the frame of Android TV, the frame of the external channel will be displayed, so that the frames of both systems can be displayed. As such, if touch data of Android TV is transmitted to the system through the external channel interface in real time, the system can be controlled through the external channel interface.

However, in actual operation, if writing is performed on the writing application software on the system through the external channel interface, due to the delay of transferring touch data and the delay of decoding and display of the HDMI format, the handwriting display on the system through the external channel interface will be delayed, causing that the writing cannot keep up with the action of hands.

Current solutions are as follows: a transparent writing layer on Android system is superimposed, and the system through the external channel interface and the Android system simultaneously draw the same handwriting according to the touch data. Since Android system has no display delay, the handwriting of Android system covers up the handwriting of the system through the external channel interface, forming an illusion that the handwriting of the system through the external channel interface does not have a delay.

However, this solution has a further technical problem. Because handwritings are drawn through the API respectively provided by the systems, there will be differences between the handwriting drawn by the system through the external channel interface and the handwriting drawn by the Android system. Because of this, a user will perceive the differences between the handwritings drawn by the two systems.

Therefore, there is a need for technical solution for the writing delay problem in the current implementations of the external system when using dual-system to perform writing.

SUMMARY OF THE INVENTION

The embodiments of the disclosure provide a dual-system device, its writing method and apparatus, and an interactive intelligent tablet, so as to at least solve the technical problem in the prior art of writing delay of an external system when using dual-system to perform writing.

An aspect of one embodiment of the disclosure provides a writing method of a dual-system device, comprising: receiving, by a first system and a second system, touch data, wherein the data rendering speed of the first system is faster than that of the second system, and the data processing speed of the second system is faster than that of the first system; acquiring, by the first system, data to be rendered from a target storage area, wherein the data to be rendered is generated by the second system according to the touch data and stored in the target storage area; and rendering, by the first system, the data to be rendered to obtain handwriting data to be displayed, and transmitting the handwriting data to be displayed to a display screen of the dual-system device for display.

Optionally, before the first system and the second system receive the touch data, the first system starts a rendering application according to a trigger of the second system, wherein, when the second system starts a writing application, the second system sends the trigger to the first system to start the rendering application.

Optionally, the target storage area also stores information of update area generated by the second system, wherein acquiring, by the first system, data to be rendered from the target storage area comprises: monitoring, by the first system, a change of content in the target storage area; reading, by the first system, the information of update area in the target storage area; and reading, by the first system, the data to be rendered of the corresponding area from the target storage area according to the information of update area.

Optionally, rendering, the first system, the data to be rendered comprises: determining, the first system, a corresponding target rendering area in the first system according to the information of update area; and rendering, the first system, the target rendering area according to the read data to be rendered to obtain the handwriting data to be displayed.

Optionally, the first system is an Android system, and the second system is one of a Windows system, an Android system, a Mac OS, or a Linux system.

An aspect of one embodiment of the disclosure provides a writing method of a dual-system device, comprising: receiving, by a second system and a first system, touch data, wherein the data rendering speed of the first system is faster than that of the second system, and the data processing speed of the second system is faster than that of the first system; generating, by the second system, data to be rendered according to the touch data; and storing, by the second system, the data to be rendered in the target storage area, wherein the first system acquires the data to be rendered from the target storage area, renders the data to be rendered to obtain handwriting data to be displayed, and transmits the handwriting data to be displayed to a display screen of the dual-system device for display.

Optionally, before the second system and the first system receive the touch data, the second system starts a writing application; after the second system starts the writing application, the second system triggers the first system to start a rendering application.

Optionally, while the second system stores the data to be rendered in the target storage area, the second system stores, in the target storage area, information relating to the update area in which update content in a canvas is located.

Optionally, the information relating to the update area includes: information relating to the upper end, the bottom end, the left end, and the right end of an outer rectangular frame of the update content in the canvas.

Another aspect of one embodiment of the disclosure further provides a writing method of a dual-system device, comprising: receiving, by a first system, touch data and transferring the touch data to a second system, wherein the data rendering speed of the first system is faster than that of the second system, and the data processing speed of the second system is faster than that of the first system; the second system generates data to be rendered according to the touch data, and stores the data to be rendered in a target storage area; and acquiring, by the first system, the data to be rendered from the target storage area, rendering the data to be rendered to obtain handwriting data to be displayed, and transmitting the handwriting data to be displayed to a display screen of the dual-system device for display.

Optionally, before the first system receives the touch data, the second system starts a writing application; after the second system starts the writing application, the second system triggers the first system to start a rendering application; and starting, by the first system, the rendering application according to a trigger of the second system.

Optionally, while the second system generates data to be rendered according to the touch data, and stores the data to be rendered in a target storage area, and the second system stores, in the target storage area, information relating to update area in which update content in a canvas is located.

Optionally, the first system monitors a change of content in the target storage area; the first system reads the information relating to update area stored in the target storage area; and the first system reads the data to be rendered of the corresponding area from the target storage area according to the information of update area.

Optionally, the first system determines a corresponding target rendering area in the first system according to the information relating to update area; and the first system renders the target rendering area according to the read data to be rendered to obtain the handwriting data to be displayed.

Optionally, the information relating to update area includes: information relating to the upper end, the bottom end, the left end, and the right end of an outer rectangular frame of the update content in the canvas.

Optionally, the first system is an Android system, and the second system is one of a Windows system, an Android system, a Mac OS, or a Linux system.

Another aspect of one embodiment of the disclosure further provides a dual-system device, comprising: a first system configured to receive touch data generated by a touch screen and transfer touch data generated in a transparent area to a second system; the second system, which communicates with the first system, configured to generate data to be rendered according to the touch data transferred by the first system, and store the data to be rendered in a target storage area, wherein the data rendering speed of the first system is faster than that of the second system, and the data processing speed of the second system is faster than that of the first system; a target storage area configured to store the data to be rendered generated by the second system; wherein the first system is further configured to acquire the data to be rendered from the target storage area, render the data to be rendered to obtain handwriting data to be displayed, and transmit the handwriting data to be displayed to a display screen of the dual-system device for display.

Optionally, the second system is further configured to start a writing application according to a predetermined instruction, and trigger the first system to start a rendering application.

Optionally, the target storage area is further configured to store information relating to an update area generated by the second system.

Optionally, the information relating to the update area in the canvas includes: information relating to the upper end, the bottom end, the left end, and the right end of the outer rectangular frame of the update content in the canvas.

Optionally, the first system is further configured to monitor the target storage area, and when monitoring a change of content in the target storage area, the first system reads the information relating to the update area in the target storage area, and reads the data to be rendered of the corresponding area from the target storage area according to the information relating to the update area, so as to rendering the data to be rendered according to the information relating the update area.

Optionally, the first system is further configured to determine a corresponding target rendering area in the first system according to the information relating to the update area; and render the target rendering area according to the read data to be rendered.

Another aspect of one embodiment of the disclosure further provides an interactive intelligent tablet, comprising: a first system configured to receive touch data generated by a touch screen and transfer touch data generated in a transparent area to a second system; a second system, which communicates with the first system, configured to generate data to be rendered according to the touch data transferred by the first system, and store the data to be rendered in a target storage area, wherein the data rendering speed of the first system is faster than that of the second system, and the data processing speed of the second system is faster than that of the first system; a target storage area configured to store the data to be rendered generated by the second system; wherein the first system is further configured to acquire the data to be rendered from the target storage area, render the data to be rendered to obtain handwriting data to be displayed, and transmit the handwriting data to be displayed to a display screen of the dual-system device for display.

Another aspect of one embodiment of the disclosure further provides writing apparatus of a dual-system device, comprising: a transferring module configured to cause a first system and a second system to receive touch data, wherein the data rendering speed of the first system is faster than that of the second system, and the data processing speed of the second system is faster than that of the first system; an acquiring module configured to cause the first system to acquire data to be rendered from a target storage area, wherein the data to be rendered is generated by the second system according to the touch data and stored in the target storage area; and a rendering module configured to cause the first system to render the data to be rendered to obtain handwriting data to be displayed, and transmit the handwriting data to be displayed to a display screen of the dual-system device for display.

Another aspect of one embodiment of the disclosure further provides writing apparatus of a dual-system device, comprising: a receiving module configured to cause a second system and a first system to receive touch data, wherein the data rendering speed of the first system is faster than that of the second system, and the data processing speed of the second system is faster than that of the first system; a generating module configured to cause the second system to generate data to be rendered according to the touch data; and a storing module configured to cause the second system to store the data to be rendered in a target storage area; wherein the first system acquires the data to be rendered from the target storage area, renders the data to be rendered to obtain handwriting data to be displayed, and transmits the handwriting data to be displayed to a display screen of the dual-system device for display.

Another aspect of one embodiment of the disclosure further provides writing apparatus of a dual-system device, comprising: a transferring module configured to cause a first system to receive touch data and transfer the touch data to a second system, wherein the data rendering speed of the first system is faster than that of the second system, and the data processing speed of the second system is faster than that of the first system; a receiving module configured to cause the second system to generate data to be rendered according to the touch data and store the data to be rendered in a target storage area; and a rendering module configured to cause the first system to acquire the data to be rendered from the target storage area, render the data to be rendered to obtain handwriting data to be displayed, and transmit the handwriting data to be displayed to a display screen of the dual-system device for display.

Another aspect of one embodiment of the disclosure further provides a storage medium stored therein a program that, when the program is executed, controls an apparatus to perform the steps of: receiving, by a first system and a second system, touch data, wherein the data rendering speed of the first system is faster than that of the second system, and the data processing speed of the second system is faster than that of the first system; acquiring, the first system, data to be rendered from a target storage area, wherein the data to be rendered is generated by the second system according to the touch data and stored in the target storage area; and the first system renders the data to be rendered to obtain handwriting data to be displayed, and transmitting the handwriting data to be displayed to a display screen of the dual-system device for display.

Another aspect of one embodiment of the disclosure further provides a processor, which is configured to run a program, wherein, when the program is running, the processor performs the steps of: receiving, a first system and a second system, touch data, wherein the data rendering speed of the first system is faster than that of the second system, and the data processing speed of the second system is faster than that of the first system; acquiring, the first system, data to be rendered from a target storage area, wherein the data to be rendered is generated by the second system according to the touch data and stored in the target storage area; and the first system renders the data to be rendered to obtain handwriting data to be displayed, and transmitting the handwriting data to be displayed to a display screen of the dual-system device for display.

In embodiments of the disclosure, a first system receives touch data and transfers the touch data to a second system, wherein the first system is a system of the device itself, the second system is a system that accessed the device through an external channel, and the first system acquires data to be rendered from a target storage area, wherein the data to be rendered is drawn by the second system according to the touch data, and the first system renders the data to be rendered. The above-mentioned solution uses the system of the device itself to render the data to be rendered drawn by the external system without encoding and decoding the rendered frame, so as to reduce the delay of displaying the data to be rendered of the external system, thereby solving the technical problem in the prior art of the writing delay of the external system when using the dual-system to perform writing.

BRIEF DESCRIPTION OF THE DRAWINGS

The drawings described herein are used to provide a further understanding of the present disclosure and constitute a part of this application. The exemplary embodiments and descriptions of which are used to explain the present disclosure, and do not constitute an improper limitation of the present disclosure. In the drawings.

DESCRIPTION OF THE PREFERRED EMBODIMENT

In order to enable those skilled in the art to better understand the solutions of the present disclosure, the technical solutions in the embodiments of the present disclosure will be described clearly and completely with reference to the drawings in the embodiments of the present disclosure. Obviously, the described embodiments are only a part but not all of the embodiments of the present disclosure. Based on the embodiments of the present disclosure, all other embodiments obtained by those skilled in the art without creative work shall fall within the claimed scope of the present disclosure.

It should be noted that such terms as "first" and "second" in the description and claims of the present disclosure and the above-mentioned drawings are used to distinguish similar objects, and not necessarily used to describe a specific order or sequence. It should be understood that the data used in this way can be interchanged under appropriate circumstances, so that the embodiments of the present disclosure described herein can be implemented in an order other than those illustrated or described herein. In addition, the terms of "include" and "have" and any variations thereof are intended to cover non-exclusive inclusion, for example, a process, method, system, product or device that includes a series of steps or units is not necessarily limited to those clearly listed steps or units, but may include other steps or units that are not clearly listed or are inherent to these processes, methods, products, or devices.

Embodiment 1

An embodiment of the present disclosure provides an embodiment of a writing method of a dual-system device. It should be noted that the steps shown in the flowchart of the drawings can be executed in a computer system with a set of computer-executable instructions. Although a logical sequence is shown in the flowchart, in some cases, the steps shown or described may be performed in a different order from those herein.

Figure 1:
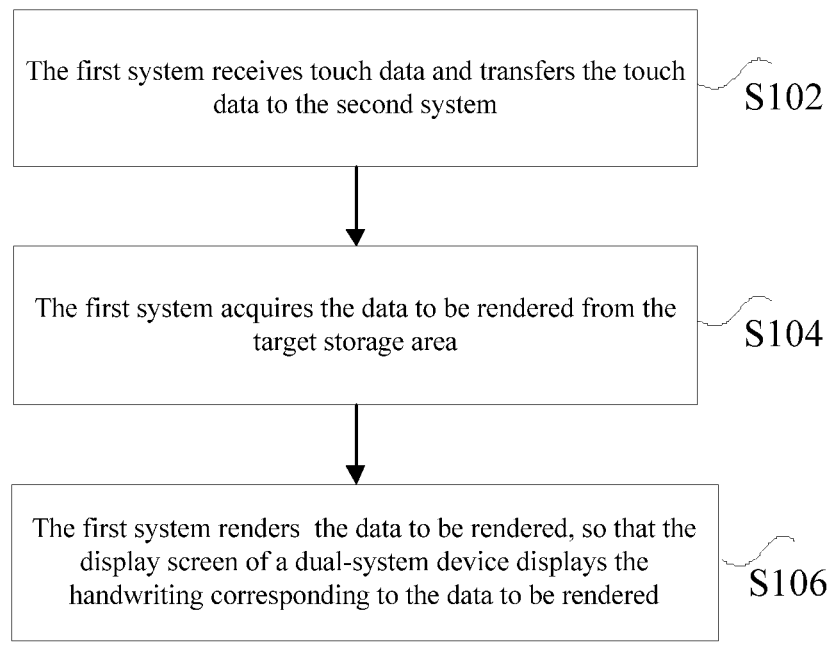
FIG. 1 is a flowchart of a writing method of a dual-system device according to Embodiment 1 of the present disclosure.

FIG. 1 is a flowchart of a writing method of a dual-system device according to Embodiment 1 of the present disclosure.

A handwriting recognition method of the interactive intelligent device provided in this embodiment can be executed by a writing display device. The writing display device can be implemented in software and/or hardware. The writing display device may be composed of two or more physical entities, or it is a physical entity. The writing display device can be a computer, a mobile phone, a tablet computer, a projector or an interactive intelligent tablet, etc. In the following embodiments, taking an interactive intelligent tablet as an example of a writing display device for description, the interactive intelligent tablet may be an integrated device that controls the content displayed on the display tablet with the touch technology and realizes human-computer interaction operations, and the interactive intelligent tablet integrates one or more functions such as projector, electronic white board, screen, speaker, TV and video conference terminal.

In the following embodiments, the interactive intelligent tablet establishes a data connection with at least one external apparatus. Thereinto, external apparatus include but are not limited to: mobile phones, notebook computers, USB flash drives, tablet computers, desktop computers, etc. The communication mode of the data connection between the external apparatus and the interactive intelligent tablet is not limited to those described in the embodiment, and the communication mode may be USB connection, Internet, LAN, Bluetooth, Wi-Fi, or Zigbee protocol.

Furthermore, the interactive intelligent tablet includes a touch screen. The touch screen may be a touch screen that can realize a single touch function, such as a capacitive touch screen, an electromagnetic touch screen, and an infrared touch screen, or may be a touch screen that can simultaneously realize capacitive sensing, electromagnetic sensing, and infrared sensing. When the user touches the touch screen of the interactive intelligent tablet with a finger or a writing pen, the capacitance parameter of the touch position changes, and the touch screen determines the touch position of the finger or the writing pen on the touch screen according to the change in capacitance. Or, when the finger or the writing pen touches the touch screen, the infrared receiving end is blocked from receiving infrared signals, the touch screen determines the touch position of the finger according to the blocked infrared signal. Or, when the user uses an electromagnetic pen to touch the touch screen, electromagnetic induction occurs at the touch position of the electromagnetic pen and the touch screen, resulting in a change in magnetic flux. The touch screen determines the position where the touch screen is touched by the electromagnetic pen according to the change in magnetic flux.

Optionally, a whiteboard application software is installed in the interactive intelligent tablet. The whiteboard application software can be pre-installed in the above-mentioned interactive intelligent tablet, or it can be a writing application software downloaded and installed from a third-party device or server when the interactive intelligent tablet is started. The third-party device is not limited in the embodiment. Specifically, the whiteboard application software is used to acquire the operation of the user's finger or the electromagnetic pen on the writing interface, acquire multiple control points according to the operation of the user, and generate the user's writing data to be rendered according to the control points. Thereinto, the interactive intelligent tablet also displays the generated writing data to be rendered on the display screen. The parameters, such as color and thickness, of the writing data to be rendered displayed on the display screen can be default values of the whiteboard application software, or it can be selected by the user through a control panel before writing.

As shown in FIG. 1, the method includes the steps as follows:

Step S102, a first system and a second system receive touch data, wherein the data rendering speed of the first system is faster than that of the second system, and the data processing speed of the second system is faster than that of the first system.

In an optional embodiment, the first system may be the system of the device itself, and the second system may be a system that accesses the device through an external channel, and the first system receives touch data and transfers the touch data to the second system.

Specifically, the touch data may be data generated when the user operates on the touch screen of the dual-system device, and the external channel may be a channel provided by an interface such as an HDMI or a VGA interface for an external device. In the case where the touch data is data generated in a transparent area of the first system, since the first system does not have any controls over the transparent area and will not intercept the touch data therein, the first system transfers the touch data to the second system.

As an optional embodiment, the first system is an Android system, and the second system is one of a Windows system, an Android system, a Mac OS, or a Linux system.

Taking an interactive intelligent tablet with Android system as an example, the first system of the interactive intelligent tablet is the Android system, which is implemented by the Android module integrated in the interactive intelligent tablet. In the case that the interactive intelligent tablet provides an HDMI/VGA interface, a PC module (for example, a Windows module, an Android module, a Mac OS module, a Linux module, etc.) may be inserted through the above-mentioned interface, so as to obtain the second system of the interactive intelligent tablet. Preferably, the second system is a Windows system provided by a Windows module plugged into the interactive intelligent tablet.

The first system is realized by the Android module integrated in the interactive intelligent tablet, and the first system is a system that guarantees the basic working functions of the interactive intelligent tablet. The second system is a system provided by the PC module plugged into the interactive intelligent tablet, which accesses the interactive intelligent tablet through an external channel, and provides richer and more diversified functions for the interactive intelligent tablet. The hardware configuration of the external PC module will be higher than that of the Android module, and the second system provided by the PC module has more powerful data processing capabilities, that is, the data processing speed of the second system will be faster than that of the first system. But when the second system displays data, the display data is needed to be transmitted to the first system of the interactive intelligent tablet through an external channel. If the second system directly performs data rendering, generates rendering data, and then transmits the rendering data to the display screen of the interactive intelligent tablet through the first system for display, the rendering data needs to be encoded according to the data transmission format supported by the external channel (such as HDMI/VGA interface), the first system receives the rendering data and then decodes the rendering data, and then transmits the rendering data to the display screen for display, therefore, the rendering speed of the second system is slower than that of the first system.

In the above-mentioned example, different applications can be installed on the first system and the second system. When the applications on the first system and the second system need to be used simultaneously, a dual-system mode can be selected on the interactive intelligent tablet. In the dual-system mode, the first system is still on the uppermost layer of the display interface of the interactive intelligent tablet, but the uppermost layer will provide a transparent area, and through transparent area, the running interface of the second system can be displayed, so that the user can see the interface provided by the two systems with one screen of the interactive intelligent tablet. In this case, if the second system is to be operated, the first system needs to transfer touch data to the second system. The touch data is generated by the touch screen in the corresponding transparent area of the uppermost layer and transferred from the first system to the second system. Herein, the touch data generated by the touch screen in the corresponding transparent area of the uppermost layer refers to the touch data generated by the touch screen when the position where the user writes on the touch screen with a finger, writing pen, or electromagnetic pen falls within the range of the transparent area, that is, the touch data generated by the touch screen when the user performs a touch operation (a touch operation above the display screen of the second system) within the range of the transparent area.

Step S104, the first system acquires the data to be rendered from a target storage area, wherein the data to be rendered is generated by the second system according to the touch data, and stored in the target storage area.

Specifically, the dual-system device includes a shared disk, and the above-mentioned target storage area can be the shared disk of the dual-system device, and any system of the device can access data in the shared disk. The data to be rendered acquired by the first system from the target storage area may be the data to be rendered generated on the software canvas by the second system.

In an optional embodiment, the second system generates data to be rendered according to the touch data, and then store the canvas generated for the data to be rendered into the target storage area, and the first system acquires the canvas generated for the data to be rendered from the target storage area.

It can be seen from the above-mentioned step S104 that in the solution of the present application, the data to be rendered is generated by the second system. Therefore, no matter whether the data to be rendered is rendered by the first system or the second system, all the handwritings obtained by rendering the data to be rendered are generated by the second system, that is, all the handwritings are the same.

As an optional embodiment, the target storage area further stores information of update area generated by the second system. For example, the first system can create two files in the target storage area. The first file is used to store the data to be rendered generated by the second system, and the second file is used to store the information of update area generated by the second system, wherein, step S104 may specifically further includes:

Step S1041, the first system monitors a change of content in the target storage area.

Specifically, the content in the target storage area includes the canvas of the second system. When the second system generates the data to be rendered, the canvas changes, so that when the second system generates the data to be rendered, the first system can detect the change by monitoring.

In the above-mentioned solution, the first system acquires the change of the canvas of the second system in real time by monitoring the target storage area, so that the data to be rendered generated by the second system according to the touch data can be detected in time.

Step S1043, the first system reads the information of update area in the target storage area.

Specifically, the data to be rendered is used to update the canvas, and the information of update area is used to determine the update area of the canvas corresponding to the data to be rendered.

In an optional embodiment, the second system may store the updated canvas information (i.e. the data to be rendered) in the first file, and store the information specifying the update area used to characterize the update area of the canvas in the second file. The information specifying the update area may include descriptive parameters of Left, Top, Right and Bottom. According to these parameters, a rectangle can be obtained, and the rectangle is the update area of the canvas, and is also the border rectangle of the data to be rendered this time.

Step S1045, the first system reads the data to be rendered of the corresponding area from the target storage area, according to the information specifying the update area.

In the above-mentioned solution, while the first system starts the rendering application, the first system starts to monitor whether the second file in the target storage area changes. When the content of the target storage area changes, the first system reads the information specifying the update area from the second file to determine in which area in the canvas of the second system the data to be rendered is generated, and then acquires the content of the corresponding area in the canvas according to the information specifying the update area.

In the above-mentioned solution, in addition to the data to be rendered, the first system also reads the information specifying the update area, so that when the data to be rendered is rendered, it is not necessary to render not the entire display area, but only the area corresponding to the information of update area, thereby not only improving the rendering speed but also achieving the purpose of saving computing resources.

Step S106, the first system renders the data to be rendered and thus obtain the handwriting data to be displayed, and transmits the handwriting data to be displayed to a display screen of the dual-system device for display.

In the above-mentioned step S106, since the first system renders the data to be rendered in this embodiment, the data to be rendered of the second system can be displayed on the interface provided by the first system after being rendered.

Step S106 specifically includes: the first system determines the corresponding target rendering area in the first system according to the information specifying the update area, and the first system renders the target rendering area according to the read data to be rendered.

Through the above solution, the data to be rendered acquired by the first system during rendering is not the content of the entire canvas of the second system, but the content corresponding to the area where the data to be rendered is generated, so that when the first system is performing frame rendering, it is not necessary to render the entire screen, but only to write the read data to be rendered into the target rendering area and render the target rendering area, thereby providing faster the display speed and further reducing the delay phenomenon when operating the writing application of the second system.

It should be noted that, for the handwriting of the external system (i.e. the second system) of the device, since the second system communicates with the device through the PC module according to VGA/HDMI, if the second system generates and renders the data to be rendered, when the frame rendered by the second system is displayed, the encoding and decoding of the frame is required, resulting in the display delay. Since there may also be differences between the handwritings drawn by the first system and the second system according to the same touch data, if the first system generates and renders the data to be rendered, it will result in generating two different handwritings according to the same set of touch data.

In the above-mentioned solution of the present disclosure, since the data to be rendered is rendered by the first system, the frame corresponding to the data to be rendered generated by the second system does not need to be encoded or decoded, and is displayed directly through the first system, and is superimposed on the frame of the second system. Also, because the data to be rendered is generated by the second system, the handwriting obtained corresponding to the data to be rendered on the frame of the first system can completely cover the handwriting on the second system, so as to cover up the delay caused by the necessity of encoding and decoding the frame in the second system.

As set forth, in the above embodiment of the present disclosure, the first system receives touch data and transfers the touch data to the second system, wherein the first system is a system of the device itself, and the second system is the system that accesses the device through an external channel. The first system acquires the data to be rendered from the target storage area, wherein the data to be rendered is drawn by the second system according to the touch data, and the first system renders the data to be rendered. In the above solution, the system of the device itself is used to render the data to be rendered that are drawn by the external system without encoding and decoding the rendered frame, so as to reduce the delay of displaying the data to be rendered of the external system, thereby solving the technical problem in the prior art of the writing delay of the external system when using the dual-system to perform writing.

Embodiment 2

Figure 2:
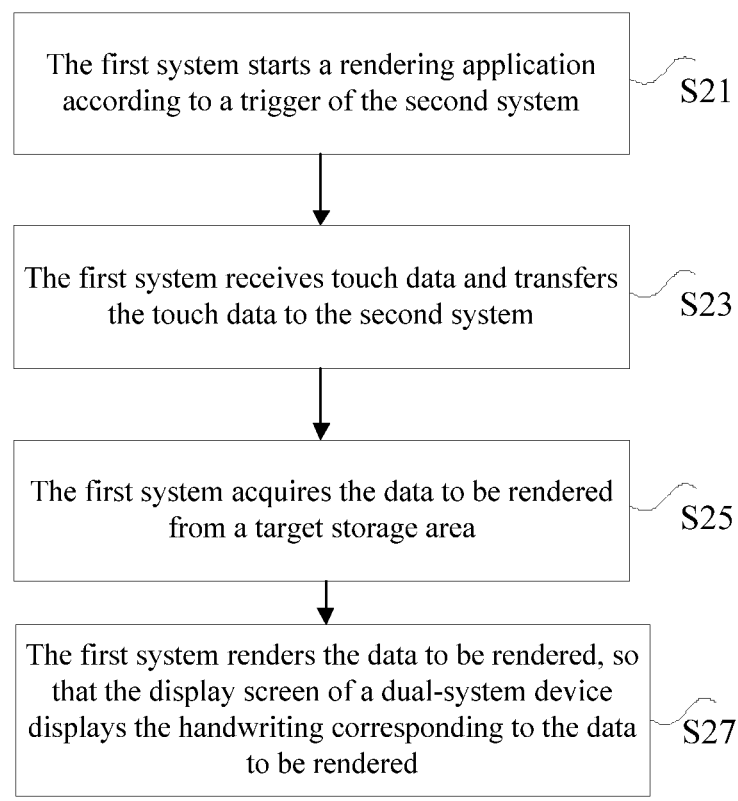
FIG. 2 is a flowchart of a writing method of a dual-system device according to Embodiment 2 of the present disclosure.

FIG. 2 is a flowchart of a writing method of a dual-system device according to Embodiment 2 of the present disclosure. This embodiment includes specifics based on the above-mentioned Embodiment 1. The method includes the steps that:

Step S21, a first system and a second system receive touch data, wherein the data rendering speed of the first system is faster than that of the second system, and the data processing speed of the second system is faster than that of the first system.

In an optional embodiment, the first system can be a system of the device itself, and the second system can be a system that accesses the device through an external channel. The first system receives touch data and transfers the touch data to the second system.

Specifically, the above-mentioned writing application may be a whiteboard application. In an optional embodiment, the user operates the second system in a transparent area and starts the whiteboard application of the second system. After the second system starts the whiteboard application, the second system informs the first system of the message through a communication link with the first system, and the first system starts the rendering application after learning that the second system has started the whiteboard application.

Step S23, the first system receives touch data and transfers the touch data to the second system, wherein the first system is a system of the device itself, and the second system is a system that accesses the device through the external channel.

Step S25, the first system acquires data to be rendered from a target storage area, wherein the data to be rendered is generated by the second system according to the touch data and stored in the target storage area.

Step S27, the first system renders the data to be rendered to obtain handwriting data to be displayed, and transmits the handwriting data to be displayed to a display screen of the dual-system device for displaying the handwriting corresponding to the data to be rendered.

As set forth, in the above embodiment of the present application, the first system starts a rendering application according to a trigger of the second system, and the first system receives touch data and transfers the touch data to the second system, wherein the first system is a system of the device itself, and the second system is a system that accesses the device through an external channel. The first system acquires the data to be rendered from the target storage area, wherein the data to be rendered is drawn by the second system according to the touch data, and the first system renders the data to be rendered. In the above solution, the system of the device itself is used to render the data to be rendered drawn by the external system without encoding and decoding the rendered frame, so as to reduce the delay of displaying the data to be rendered of the external system, thereby solving the technical problem in the prior art of the writing delay of the external system when using the dual-system to perform writing.

Embodiment 3

The embodiment of the present disclosure provides an embodiment of a writing method of a dual-system device. It should be noted that the steps shown in the flowchart of the drawings can be executed in such a computer system with a set of computer-executable instructions. Although the logical sequence is shown in the flowchart, in some cases, the steps shown or described can be performed in a different order from those herein.

Figure 3:
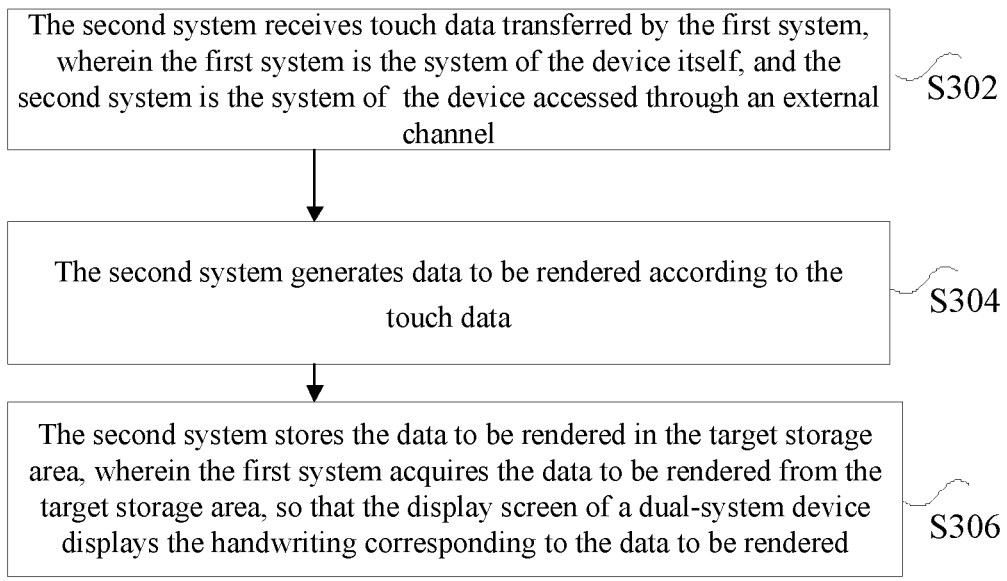
FIG. 3 is a flowchart of a writing method of a dual-system device according to Embodiment 3 of the present disclosure.

FIG. 3 is a flowchart of a writing method of a dual-system device according to Embodiment 3 of the present disclosure. As shown in FIG. 3, the method includes the steps that:

Step S302, the second system and the first system receive touch data, wherein the data rendering speed of the first system is faster than that of the second system, and the data processing speed of the second system is faster than that of the first system.

In an optional embodiment, the first system can be a system of the device itself, and the second system can be a system that accesses the device through an external channel. The first system receives touch data and transfers the touch data to the second system.

Specifically, the touch data transferred by the first system to the second system is generated in a transparent area in the display interface of the interactive intelligent device.

Step S304, the second system generates data to be rendered according to the touch data.

After the second system receives the touch data, the second system generates the data to be rendered on the software canvas according to the touch data. After the data to be rendered is generated, the rendering of the data to be rendered may be prohibited, or the rendering of the data to be rendered may be continued.

As set forth, in the above embodiment of the present application, since the data to be rendered are generated by the second system, no matter whether the data to be rendered is rendered by the first system or the second system, all the handwritings obtained by rendering the data to be rendered are generated by the second system, that is, all the handwritings are the same.

Step S306, the second system stores the data to be rendered in the target storage area, wherein the first system acquires the data to be rendered from the target storage area, and renders the data to be rendered to obtain handwriting data to be displayed, and transmits the handwriting data to be displayed to a display screen of the dual-system device for display.

Specifically, the second system stores the canvas to draw the data to be rendered into the target storage area.

In the above step S306, the second system stores the canvas to draw the data to be rendered into the target storage area of the dual system, and the first system acquires and renders the data to be rendered in the canvas. Since the first system performs the rendering, the rendering result can be directly displayed on the frame provided by the first system. Also, since the data transmitted by the second system to the target storage area through HDMI/VGA is the data to be rendered rather than the rendered frame, there is no need to perform encoding and decoding, thereby avoiding the display delay caused by the necessity of encoding and decoding the frame.

As set forth, in the above embodiment of the present application, the second system receives touch data transferred by the first system, wherein the first system is a system of the device itself, and the second system is a system that accesses the device through an external channel; the second system draws the data to be rendered according to the touch data, and stores the data to be rendered in the target storage area of the dual system; and the first system acquires the data to be rendered from the target storage area and renders the data to be rendered. In the above solution, the second system draws the data to be rendered and the first system performs rendering, so as to avoid the display delay caused by the necessity of encoding and decoding the frame, thereby solving the technical problem in the prior art of the writing delay of the external system when using the dual-system to perform writing.

Optionally, according to the above embodiment of the present application, before the second system and the first system receive touch data, the above-mentioned method further includes the steps that: the second system starts the writing application, and the second system triggers the first system to start the rendering application after the writing application is started.

Specifically, the user can trigger the writing application of the second system. When starting the writing application, the second system informs the first system through a preset communication mode among multiple systems. The first system starts the rendering application after being informed.

Optionally, according to the above embodiment of the present application, while the second system stores the data to be rendered in the target storage area, the above-mentioned method further includes the steps that: the second system stores the information specifying the update area—namely, the area where the updated content in the canvas is located in the target storage area.

In an optional embodiment, the target storage area includes two files. The first file is configured to store the data to be rendered, and the second file is configured to store the information specifying the update area. The second system synchronizes the updated content in the canvas to the first file, and synchronizes the area information of the area where the updated content in the canvas is located to the second file.

In the above-mentioned embodiment, the two files in the target storage area may be created by the first system. After the first system creates the two files, the first system informs the second system of the paths of the two files, and the second system stores the corresponding information in two files during drawing the data to be rendered.

In an optional embodiment, the second system draws the data to be rendered according to the received touch signal, and stores the part of data to be rendered drawn in the canvas to the first file, and then acquires the information specifying the update area, that is, the information of the outer rectangular frame of the data to be rendered, and stores the information specifying the update area in the second file, wherein the information includes parameters of top side, bottom side, left side, and right side.

Optionally, according to the above embodiment of the present application, the information specifying the update area in the canvas includes: information on the upper end, the bottom end, the left end, and the right end of the outer rectangular frame of the update content in the canvas.

Figure 4:
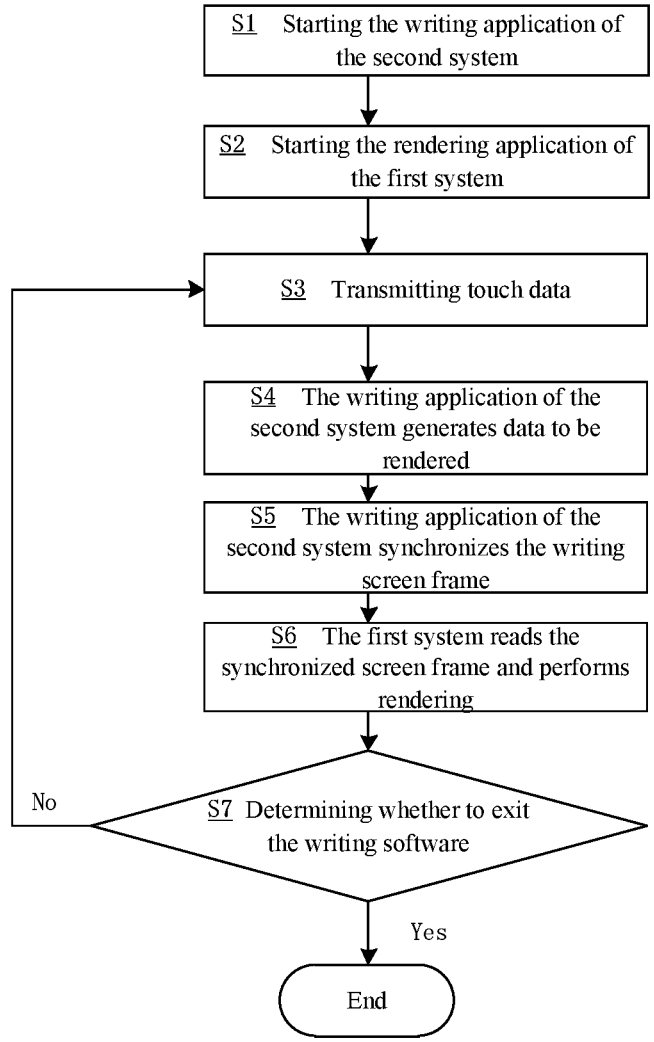
FIG. 4 is a flowchart of an optional writing method of a dual-system device according to Embodiment 3 of the present disclosure.

FIG. 4 is a flowchart of an optional writing method of a dual-system device according to Embodiment 3 of the present disclosure. Hereinafter, the methods in Embodiment 1 and Embodiment 2 are described with reference to FIG. 4.

S1: Starting the writing application of the second system.

Specifically, the second system may be the system (such as windows/Linux/Android, etc.) of the device accessed through an external channel interface such as HDMI/VGA of Android TV, and the second system receives touch data of Android TV to implement touch operations. There is a target storage area between the second system and the first system, that is, the content written by the second system in real time can also be read by the first system in real time. When the writing software of the second system is started, the first system creates two files in the target storage area, one is a canvas file, and the other is a rendering area information file. The size of the canvas file is the same as the canvas of the writing software.

S2: Starting the rendering application of the first system.

Specifically, when the second system starts the writing software, the second system informs the first system to start the rendering software through the communication mode preset by the dual system. When the first system starts the rendering software, the first system starts a monitoring thread for monitoring file changes in the target storage area.

S3: Transmitting the touch data.

Specifically, the first system acquires touch data from a touch device (hardware devices such as infrared frame, capacitive screen, electromagnetic screen, etc.), and transmits the touch data to the second system through a dual-system communication mode.

S4: The writing application of the second system generates data to be rendered.

After the writing application of the second system receives the touch data, the writing application of the second system draws and generates a rendering data curve (such as a Bezier curve), that is, the data to be rendered, on the software canvas according to the touch data points.

S5: The writing application of the second system synchronizes the writing frame.

Specifically, when the writing application of the second system generates the data to be rendered on the writing canvas, the second system synchronously writes the content on the changed area of the canvas into the canvas file in S1, and writes the information specifying the changed area into the rendering area information file in S1. The rendering area information includes the values of Left, Top, Right, and Bottom, that is, rectangular area information.

S6: The rendering application of the first system reads the synchronized frame and performs rendering.

When the rendering application of the first system monitors a change in the content of the area information file, the rendering application reads the rendering area information and the value of Left, Top, Right, and Bottom, and reads the content in the corresponding area (Left, Top, Right, Bottom) in the canvas file, and writes this part of the content directly into the corresponding area (Left, Top, Right, Bottom) in the Frame-buffer of the first system. Thus, the frame of the data to be rendered of the second system is displayed by the first system and superimposed on the frame of the external channel, so as to cover up the delay caused by that the HDMI/VGA channel encodes and decodes the frame of the second system. Since the frame updated with the target storage area is not the frame of the entire screen, but the frame of the changed area, the delay is further reduced.

S7: Determining whether to exit the writing software.

In the above steps, if the writing software is exited, the above-mentioned process is terminated, and if the writing software is not exited, step S3 is executed again. When the second system exits the writing software, the second system will notify the first system to exit the rendering application, and delete the canvas file and the rendering area information file in the target storage area.

Embodiment 4

Figure 5:
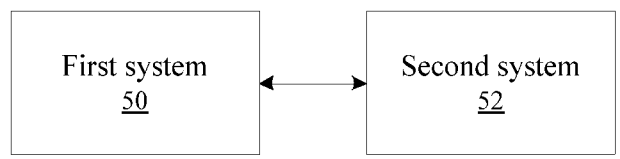
FIG. 5 is a schematic diagram of a dual-system device according to Embodiment 4 of the present disclosure.

An embodiment of the present disclosure provides an embodiment of a dual-system device. FIG. 5 is a schematic diagram of a dual-system device according to Embodiment 4 of the present disclosure. As shown in FIG. 5, the device includes:

A first system 50, configured to receive the touch data generated by the touch screen, and transfer the touch data generated in a transparent area to the second system.

Specifically, when displaying under dual systems, the display interface of the second system is displayed in the transparent area of the first system, so the first system transfers the touch data generated in the transparent area to the second system, and the second system executes the touch data.

The second system 52, which communicates with the first system, and is configured to draw the data to be rendered according to the touch data transferred by the first system, and store the data to be rendered in the target storage area of the dual system. The data rendering speed of the first system is faster than that of the second system, and the data processing speed of the second system is faster than that of the first system.

In an optional embodiment, the first system can be a system of the device itself, and the second system can be a system that accesses the device through an external channel. The first system receives touch data and transfers the touch data to the second system.

Specifically, the above-mentioned external channels may be channels such as HDMI/VGA, and the second system may be provided by a PC module. It can provide multiple systems for the device by inserting the PC module into the HDMI/VGA interface of the device.

A target storage area, configured to store the data to be rendered drawn by the second system; the first system is also configured to obtain the data to be rendered from the target storage area and render the data to be rendered to obtain the handwriting data to be displayed, and transmit the handwriting data to be displayed to a display screen of the dual-system device for display.

In the above solution, the second system draws the data to be rendered, and the first system performs rendering. Therefore, the second system stores the data to be rendered generated by the second system in the target storage area, so there is no need to perform encoding and decoding, thereby reducing the delay of displaying the data to be rendered.

As set forth in the above embodiment of the present application, the first system of the device itself receives the touch data generated by the touch screen and transfers the touch data to the second system; the second system assessing the device through an external channel is adopted to draw the data to be rendered according to the touch data transferred by the first system, stores the data to be rendered in the target storage area of the dual system, and stores the data to be rendered drawn by the second system in the target storage area, where the first system is also configured to acquire the data to be rendered from the target storage area, and render the data to be rendered. The above-mentioned solution uses the system of the device itself to render the data to be rendered that are generated by the external system without encoding and decoding the rendered frame, so as to reduce the delay of displaying the data to be rendered of the external system, thereby solving the technical problem in the current implementations of the writing delay of the external system when using the dual-system to perform writing.

The second system is further configured to start the writing application according to a predetermined instruction and trigger the first system to start the rendering application.

Specifically, the above-mentioned predetermined instruction may be an instruction of starting the writing application, which is generated when the user operates the second system. For an interactive intelligent tablet, the above-mentioned writing application may be a whiteboard application. In an optional embodiment, the first system and the second system have a pre-established communication mode. After the second system starts the writing application, the second system informs the first system through the pre-established communication mode, and after the first system receives the notification, the first system starts the rendering application.

Optionally, according to the above-mentioned embodiment of the present application, the target storage area is further configured to store the information specifying the update area generated by the second system.

In an optional embodiment, the first system creates two files in the target storage area. The first file is configured to store the data to be rendered, and the second file is configured to store the information specifying the update area. The second system is further configured to synchronize the updated content in the canvas to the first file, and synchronize the area information of the area where the updated content in the canvas is located to the second file.

In an optional embodiment, the second system draws the data to be rendered according to the received touch data, and stores the updated part (i.e. the data to be rendered) of the canvas after its drawing into the first file, and then acquires the updated area of the canvas, that is, the information of the outer rectangular frame of the data to be rendered, including parameters of top side, bottom side, left side, and right side, and stores the information of update area in the second file.

Optionally, according to the above embodiment of the present application, the information of update area in the canvas includes: information on the upper end, the bottom end, the left end, and the right end of the outer rectangular frame of the update content in the canvas.

Specifically, the above-mentioned update content is the data to be rendered drawn by the second system. The upper end, the bottom end, the left end, and the right end of the outer rectangular frame of the update area in the canvas can be described by Top, Bottom, Left, and Right. Taking the coordinates of the upper left corner of the canvas as (0, 0) as an example, (Top, Left) is the point at the upper left corner of the outer rectangle, and (Top, Right) is the point at the upper right corner of the outer rectangle. Similarly, (Bottom, Left) is the point at the lower left corner of the outer rectangle, and (Bottom, Left) is the point at the lower left corner of the outer rectangle.

Optionally, according to the above-mentioned embodiment of the present application, the first system is further configured to monitor the target storage area. When monitoring the target storage area changes, the first system reads the information specifying the update area in the target storage area, read the content from the target storage area according to the information specifying the update area, and perform rendering according to the content.

In an optional embodiment, after the second system generates a segment of data to be rendered, the canvas on which the data to be rendered has been drawn is stored in the first file, and the areas of Top, Bottom, Left and Right of the data to be rendered are stored in the second file. The first system monitors changes in the second file, reads Top, Bottom, Left, and Right, and acquires the content of the canvas in the area defined by Top, Bottom, Left, and Right in the first file, and then performs rendering according to the content.

Optionally, according to the above-mentioned embodiment of the present application, the first system is further configured to determine the corresponding target rendering area in the first system according to the information of update area, and render the target rendering area according to the read data to be rendered.

In the above solution, since the first system only acquires part of the canvas in the target storage area, it may need to determine the location where the acquired canvas should be rendered. In order that the display result on the display interface of the first system can be as the same as that of the second system, the content needs to be written into the target rendering area corresponding to the information of update area in the first system, and then rendering is performed.

Embodiment 5

Figure 6:
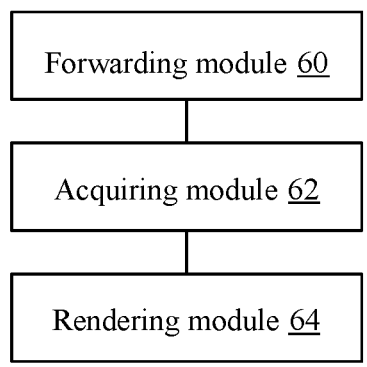
FIG. 6 is a schematic diagram of writing apparatus of a dual-system device according to Embodiment 5 of the present disclosure.

An embodiment of the present disclosure provides writing apparatus of a dual-system device. FIG. 6 is a schematic diagram of writing apparatus of a dual-system device according to Embodiment 5 of the present disclosure. Referring to FIG. 6, the device includes:

A transferring module 60 configured to cause the first system and the second system to receive touch data, where the data rendering speed of the first system is faster than that of the second system, and the data processing speed of the second system is faster than that of the first system.

In an optional embodiment, the first system can be the system of the device itself, and the second system can be the system that accesses the device through an external channel. The first system receives touch data and transfers the touch data to the second system.

Specifically, the touch data may be data generated when the user operates the touch screen of the dual-system device. In the case where the touch data is data generated in a transparent area of the first system, since the first system does not have any controls over the transparent area and will not intercept the touch data, the first system transfers the touch data to the second system. The external channel may be a channel provided by a device such as HDMI/VGA.

In an optional embodiment, taking an interactive intelligent tablet with Android system as an example, the first system of the interactive intelligent tablet is the Android system, which is implemented by the Android module integrated in the interactive intelligent tablet. In the case that the interactive intelligent tablet provides an HDMI/VGA interface, it is possible to insert a PC module (for example, a Windows module, an Android module, a Mac OS module, a Linux module, etc.) through the above-mentioned interface, so as to obtain the second system of the interactive intelligent tablet.

In the above-mentioned embodiment, different applications can be installed in the first system and the second system. When the applications of the first system and the second system need to be used simultaneously, a dual-system mode can be selected on the interactive intelligent tablet. In the dual-system mode, the first system is still on the uppermost layer of the display interface of the interactive intelligent tablet, but the uppermost layer will provide a transparent area, and the second system can be run through transparent area, so that the user can see the interface provided by the two systems with one screen of the interactive intelligent tablet. In this case, if the second system is to be operated, the first system needs to transfer touch data to the second system.

An acquiring module 62, which is configured to cause the first system to acquire data to be rendered from a target storage area, wherein the data to be rendered is generated by the second system according to the touch data and stored in the target storage area.

Specifically, the dual-system device includes a shared disk, and the above-mentioned target storage area may be the shared disk of the dual-system device, and any system of the device can access data in the shared disk. The data to be rendered acquired by the first system from the target storage area may be the data to be rendered generated on the software canvas by the second system.

A rendering module 64, which is configured to cause the first system to render the data to be rendered to obtain handwriting data to be displayed, and transmit the handwriting data to be displayed to a display screen of the dual-system device for display.

In the above-mentioned solution of this embodiment, the first system renders the data to be rendered, so that the data to be rendered of the second system can be displayed on the interface provided by the first system after rendering.

Optionally, according to the above-mentioned embodiment of the present application, the above-mentioned apparatus further includes: a triggering module, which is configured to cause the first system to start the rendering application according to a trigger from the second system before the first system and the second system receive the touch data, wherein the second system triggers the first system to start the rendering application after the writing application is started.

Optionally, according to the above-mentioned embodiment of the present application, the target storage area also stores information of update area generated by the second system, wherein the acquiring module includes:

A monitoring sub-module configured to cause the first system to monitor a change in content in the target storage area.

Specifically, when the second system draws the data to be rendered, the canvas changes, so that when the second system generates the data to be rendered, the first system can detect it by monitoring.

A first reading sub-module, which is configured to cause the first system to read the information of update area in the target storage area.

The second system can store the updated canvas information (i.e. the data to be rendered) in the first file, and store the information specifying the update area used to characterize the update area of the canvas in the second file. The information specifying the update area can include parameters of Left, Top, Right and Bottom for description, and according to these parameters, a rectangle can be obtained, and the rectangle is the update area of the canvas, and is also the outer rectangle of the data to be rendered this time.

A second reading sub-module, which is configured to cause the first system to read the data to be rendered of the corresponding area from the target storage area according to the information specifying the update area.

In the above-mentioned solution, while the first system starts the rendering application, the first system starts to monitor whether the second file in the target storage area changes. When the content of the target storage area changes, the first system reads the information specifying the update area from the second file to determine in which area in the canvas of the second system the data to be rendered is generated, and then acquires the content of the corresponding area in the canvas according to the information specifying the update area.

Optionally, according to the above-mentioned embodiment of the present application, the rendering module includes: a determining sub-module, which configured to cause the first system to determine the corresponding target rendering area in the first system according to the information specifying the update area; a rendering sub-module, which configured to cause the first system to render the target rendering area according to the read data to be rendered and thus obtain the handwriting data to be displayed.

Through the above solution, the data to be rendered acquired by the first system during rendering is not the content of the entire canvas of the second system, but the content corresponding to the area where the data to be rendered is generated, so that when the first system is performing frame rendering, it is not necessary to render the entire screen, but only to write the read data to be rendered into the target rendering area and render the target rendering area. Therefore, the display speed is faster, and the delay phenomenon when operating the writing application of the second system is further reduced.

It should be noted that, for the handwriting of the external system (i.e. the second system) of the device, since the second system communicates with the device through the PC module according to a VGA/HDMI interface, if the second system generates and renders the data to be rendered, when the frame rendered by the second system is displayed, the encoding and decoding of the frame is required, resulting in the display delay. Since there may also be differences between the handwritings drawn by the first system and the second system according to the same touch data, if the data to be rendered is generated by the first system and rendered by the first system, it will result in generating two different handwritings according to the same set of touch data.

In the above-mentioned solution of the present application, since the data to be rendered is rendered by the first system, the frame corresponding to the data to be rendered generated by the second system does not need to be encoded or decoded, and is displayed directly through the first system, and is superimposed on the frame of the second system. Also, because the data to be rendered is generated by the second system, the handwriting obtained by the data to be rendered on the frame of the first system can completely cover the handwriting on the second system, so as to cover up the delay caused by the necessity of encoding and decoding the frame in the second system.

As set forth in the above embodiment of the present application, the first system receives touch data and transfers the touch data to the second system, where the first system is a system of the device itself, and the second system is a system that accesses the device through an external channel. The first system acquires the data to be rendered from the target storage area, wherein the data to be rendered is drawn by the second system according to the touch data, and the first system renders the data to be rendered. In the above solution, the system of the device itself is used to render the data to be rendered drawn by the external system without encoding and decoding the rendered frame, so as to reduce the delay of displaying the data to be rendered of the external system, thereby solving the technical problem in the prior art of the writing delay of the external system when using the dual-system to perform writing.

Embodiment 6

Figure 7:
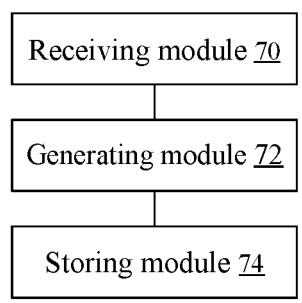
FIG. 7 is a schematic diagram of writing apparatus of a dual-system device according to Embodiment 6 of the present disclosure.

An embodiment of the present disclosure provides writing apparatus of a dual-system device. FIG. 7 is a schematic diagram of writing apparatus of a dual-system device according to Embodiment 6 of the present disclosure. Referring to FIG. 7, the apparatus includes:

A receiving module 70 configured to cause the first system and the second system to receive touch data, where the data rendering speed of the first system is faster than that of the second system, and the data processing speed of the second system is faster than that of the first system.

Specifically, the touch data transferred by the first system to the second system is touch data generated in a transparent area in the interface of the first system.

A generating module 72 configured to cause the second system to generate data to be rendered according to the touch data After the second system receives the touch data, the second system draws the data to be rendered on the software canvas according to the touch data. After the data to be rendered is drawn, the rendering of the data to be rendered may be prohibited, or the rendering of the data to be rendered may be continued.

A storing module 74 configured to cause the second system to store the data to be rendered in a target storage area, where the first system acquires the data to be rendered from the target storage area, renders the data to be rendered to obtain handwriting data to be displayed, and transmits the handwriting data to be displayed to a display screen of the dual-system device for display.

Specifically, the second system stores the canvas on which the data to be rendered has been drawn into the target storage area.

In the above solution, the second system stores the canvas on which to draw the data to be rendered into the target storage area of the dual system, and the first system acquires and renders the data to be rendered in the canvas. Since the first system performs the rendering, the rendering result can be directly displayed on the frame provided by the first system. Also, since the data transmitted by the second system to the target storage area through an HDMI/VGA interface is the data to be rendered rather than the rendered frame, there is no need to perform encoding and decoding, thereby avoiding the display delay caused by the necessity of encoding and decoding the frame.

As set forth in the above embodiment of the present application, the second system receives touch data transferred by the first system, where the first system is a system of the device itself, and the second system is a system that accesses the device through an external channel; the second system draws the data to be rendered according to the touch data; the second system stores the data to be rendered in the target storage area of the dual system; and the first system acquires the data to be rendered from the target storage area and renders the data to be rendered. In the above solution, the second system draws the data to be rendered and the first system performs rendering, so as to avoid the display delay caused by the necessity of encoding and decoding the frame, thereby solving the technical problem in the prior art of the writing delay of the external system when using the dual-system to perform writing.

As an optional embodiment, the above-mentioned apparatus further includes: a starting module configured to cause the second system to start the writing application before the second system and the first system receive touch data; and a triggering module configured to cause the second system to trigger the first system to start the rendering application after the second system starts the writing application.

Specifically, the user can trigger the writing application of the second system. After the second system starts the writing application, the second system informs the first system through a preset communication mode among multiple systems, and the first system starts the rendering application after being informed.

As an optional embodiment, the above-mentioned apparatus further includes: a storing module, which is configured to cause the second system to store the information of update area of the area where the updated content in the canvas is located in the target storage area while the second system stores the data to be rendered in the target storage area.

As an optional embodiment, the target storage area includes two files. The first file is configured to store the data to be rendered, and the second file is configured to store the information specifying the update area. The second system synchronizes the updated content in the canvas to the first file, and synchronizes the area information of the area where the updated content in the canvas is located to the second file.

In the above-mentioned embodiment, the two files in the target storage area can be created by the first system. After the first system creates the two files, the first system informs the second system of the paths of the two files, and the second system stores the corresponding information in two files during drawing the data to be rendered.

In an optional embodiment, the second system draws the data to be rendered according to the received touch signal, and stores the part of data to be rendered drawn in the canvas to the first file, then acquires the information of update area, that is, the information of the outer rectangular frame of the data to be rendered, and stores the information of update area in the second file, wherein the information includes parameters of top side, bottom side, left side, and right side.

As an optional embodiment, the information specifying the update area includes: information on the upper end, the bottom end, the left end, and the right end of the outer rectangular frame of the update content in the canvas.

Embodiment 7

Figure 8:
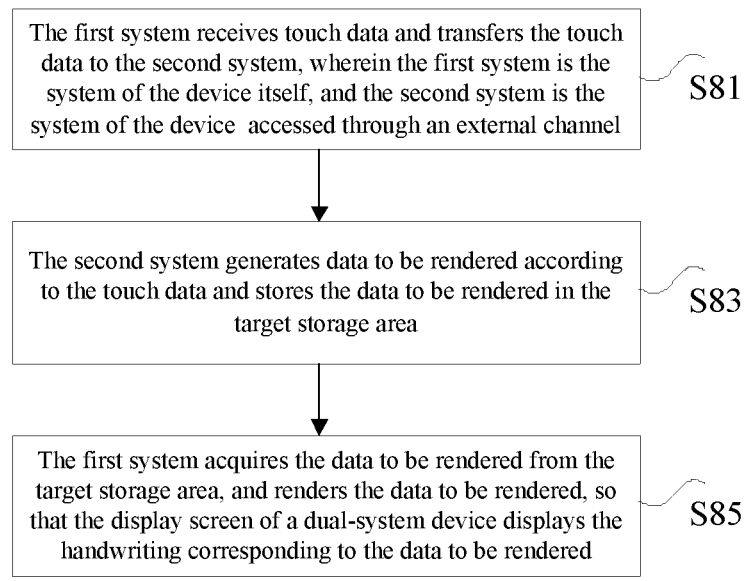
FIG. 8 is a flowchart of a writing method of a dual-system device according to Embodiment 7 of the present disclosure.

An embodiment of the present disclosure provides a writing method of a dual-system device. FIG. 8 is a flowchart of a writing method of a dual-system device according to the embodiment of the present disclosure. Referring to FIG. 8, the method includes the steps that:

Step S81, the first system receives touch data and transfers the touch data to the second system, wherein the data rendering speed of the first system is faster than that of the second system, and the data processing speed of the second system is faster than that of the first system.

In an optional embodiment, the first system can be a system of the device itself, and the second system can be a system that accesses the device through an external channel. The first system receives touch data and transfers the touch data to the second system.

Specifically, the touch data may be data generated when the user operates the touch screen of the dual-system device, and the external channel may be a channel provided by an interface such as an HDMI/VGA interface to an external device. In the case where the touch data is data generated in a transparent area of the first system, since the first system does not have any controls over the transparent area and will not intercept the touch data, the touch data is transferred to the second system.

In the above-mentioned embodiment, different applications can be installed on the first system and the second system. When the applications on the first system and the second system need to be used simultaneously, a dual-system mode can be selected on the interactive intelligent tablet. In the dual-system mode, the first system is still on the uppermost layer of the display interface of the interactive intelligent tablet, but the uppermost layer will provide a transparent area, and through the transparent area, the running interface of the second system can be displayed, so that the user can see the interface provided by the two systems with one screen of the interactive intelligent tablet. In this case, if the second system is to be operated, the first system needs to transfer touch data to the second system. The touch data is generated in the uppermost transparent area and transferred by the first system to the second system.

Step S83, the second system generates data to be rendered according to the touch data, and stores the data to be rendered in the target storage area.

After the second system receives the touch data, the second system generates the data to be rendered on the software canvas according to the touch data. After the data to be rendered is generated, the rendering of the data to be rendered may be prohibited, or the rendering of the data to be rendered may be continued.

As set forth in the above embodiment of the present application, since the data to be rendered is generated by the second system, no matter whether the data to be rendered is rendered by the first system or the second system, all the handwritings obtained by rendering the data to be rendered are generated by the second system, that is, all the handwritings are the same.

Step S85, the first system acquires the data to be rendered from the target storage area, renders the data to be rendered to obtain handwriting data to be displayed, and transmits the handwriting data to be displayed to a display screen of the dual-system device for display.

In the above step S85, the second system stores the canvas on which to draw the data to be rendered in the target storage area of the dual system, and the first system acquires and renders the data to be rendered in the canvas. Since the first system performs the rendering, the rendering result can be directly displayed on the frame provided by the first system. Also, since the data transmitted by the second system to the target storage area through an HDMI/VGA interface is the data to be rendered rather than the rendered frame, there is no need to perform encoding and decoding, thereby avoiding the display delay caused by the necessity of encoding and decoding the frame.

As set forth in the above embodiment of the present application, the first system receives touch data and transfers the touch data to the second system, where the first system is a system of the device itself, and the second system is a system that accesses the device through an external channel; the second system generates the data to be rendered according to the touch data; the second system stores the data to be rendered in the target storage area; and the first system acquires the data to be rendered from the target storage area and renders the data to be rendered, so that the display screen of the dual-system device displays the handwriting corresponding to the data to be rendered. In the above solution, the second system draws the data to be rendered and the first system performs rendering, so as to avoid the display delay caused by the necessity of encoding and decoding the frame, thereby solving the technical problem in the prior art of the writing delay of the external system when using the dual-system to perform writing.

Optionally, before the first system receives the touch data, the above method further includes the steps that: the second system starts the writing application; the second system triggers the first system to start the rendering application after the writing application is started; and the first system starts the rendering application according to a trigger of the second system.

Optionally, while the second system generates data to be rendered according to the touch data, and stores the data to be rendered in a target storage area, the method further comprises the step that: the second system stores information of update area of an area where update content in a canvas is located in the target storage area.

Optionally, the step that the first system acquires the data to be rendered from the target storage area includes: the first system monitors a change of content in the target storage area, the first system reads the information specifying the update area in the target storage area, and the first system reads the data to be rendered of the corresponding area from the target storage area according to the information specifying the update area.

Optionally, the step that the first system renders the data to be rendered to obtain the handwriting data to be displayed includes: the first system determines a corresponding target rendering area in the first system according to the information of update area, and the first system renders the target rendering area according to the read data to be rendered to obtain the handwriting data to be displayed.

Optionally, the information of update area includes: information on the upper end, the bottom end, the left end, and the right end of the outer rectangular frame of the update content in the canvas.

Optionally, the first system is an Android system, and the second system is one of a Windows system, an Android system, a Mac OS, or a Linux system.

Embodiment 8

Figure 9:
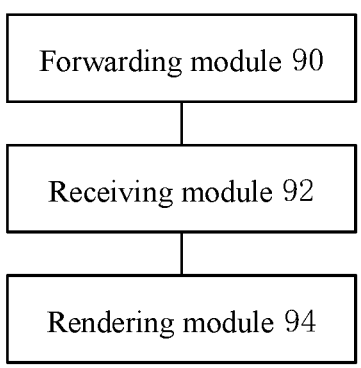
FIG. 9 is a schematic diagram of writing apparatus of a dual-system device according to Embodiment 8 of the present disclosure.

An embodiment of the present disclosure provides a writing method of a dual-system device. FIG. 9 is a schematic diagram of writing apparatus of a dual-system device according to an embodiment of the present disclosure. Referring to FIG. 9, the apparatus includes:

A transferring module 90, which is configured to cause the first system to receive touch data and transfer the touch data to the second system, wherein the data rendering speed of the first system is faster than that of the second system, and the data processing speed of the second system is faster than that of the first system.

Specifically, the touch data may be data generated when the user operates the touch screen of the dual-system device, and the external channel may be a channel provided by an interface such as HDMI/VGA for an external device. In the case where the touch data is data generated in a transparent area of the first system, since the first system does not have any controls over the transparent area and will not intercept the touch data, the touch data is transferred to the second system.

A receiving module 92 configured to cause the second system to generate data to be rendered according to the touch data and store the data to be rendered in a target storage area.

After the second system receives the touch data, the second system generates the data to be rendered on the software canvas according to the touch data. After the data to be rendered is generated, the rendering of the data to be rendered may be prohibited, or the rendering of the data to be rendered may be continued.

A rendering module 94 configured to cause the first system to acquire the data to be rendered from the target storage area, render the data to be rendered to obtain handwriting data to be displayed, and transmit the handwriting data to be displayed to a display screen of the dual-system device for display.

In the above solution, the second system stores the canvas on which the data to be rendered has been drawn in the target storage area of the dual system, and the first system acquires and renders the data to be rendered in the canvas. Since the first system performs the rendering, the rendering result can be directly displayed on the frame provided by the first system. Also, since the data transmitted by the second system to the target storage area through an HDMI/VGA interface is the data to be rendered rather than the rendered frame, there is no need to perform encoding and decoding, thereby avoiding the display delay caused by the necessity of encoding and decoding the frame.

As set forth in the above embodiment of the present application, the first system receives touch data through the transferring module, and transfers the touch data to the second system, wherein the first system is a system of the device itself, and the second system is a system that accesses the device through an external channel; the second system generates the data to be rendered according to the touch data, and stores the data to be rendered in the target storage area; and the first system acquires the data to be rendered from the target storage area and renders the data to be rendered, so that the display screen of the dual-system device displays the handwriting corresponding to the data to be rendered. In the above solution, the second system draws the data to be rendered and the first system performs rendering, so as to avoid the display delay caused by the necessity of encoding and decoding the frame, thereby solving the technical problem in the prior art of the writing delay of the external system when using the dual-system to perform writing.

Embodiment 9

An embodiment of the present disclosure provides an interactive intelligent tablet, including: a first system and a second system, wherein the first system is configured to receive touch data generated by a touch screen and transfer the touch data generated in a transparent area to the second system.

Specifically, while displaying under the dual system, the display interface of the second system is displayed in the transparent area of the first system, so the first system transfers the touch data generated in the transparent area to the second system, and the second system executes the touch data.

The second system communicates with the first system, and is configured to generate the data to be rendered according to the touch data transferred by the first system, and store the data to be rendered in the target storage area of the dual system. The data rendering speed of the first system is faster than that of the second system, and the data processing speed of the second system is faster than that of the first system.

Specifically, the above-mentioned external channels may be channels such as an HDMI/VGA interface, and the second system may be provided by a PC module. It can provide multiple systems for the interactive intelligent tablet by inserting the PC module into the HDMI/VGA interface of the interactive intelligent tablet.

In an optional embodiment, the first system can be a system of the device itself, and the second system can be a system that accesses the device through an external channel. The first system receives touch data and transfers the touch data to the second system.

The target storage area configured to store the data to be rendered generated by the second system, where the first system is also configured to acquire the data to be rendered from the target storage area and render the data to be rendered to obtain the handwriting data to be displayed, and transmit the handwriting data to be displayed to a display screen of the dual-system device for display.

In the above solution, the second system draws the data to be rendered, and the first system performs rendering. Therefore, the second system stores the data to be rendered generated by the second system in the target storage area, so there is no need to perform encoding and decoding, thereby reducing the delay of displaying the data to be rendered.

As set forth in the above embodiment of the present application, the first system of the interactive intelligent tablet itself receives the touch data generated by the touch screen and transfers the touch data to the second system. The second system of the interactive intelligent tablet accessed through an external channel is adopted to draw the data to be rendered according to the touch data transferred by the first system, stores the data to be rendered in the target storage area of the dual system, and the data to be rendered drawn by the second system is stored through the target storage area, wherein the first system is also configured to acquire the data to be rendered from the target storage area, and render the data to be rendered. The above-mentioned solution uses the system of the interactive intelligent tablet itself to render the data to be rendered generated by the external system without encoding and decoding the rendered frame, so as to reduce the delay of displaying the data to be rendered of the external system, thereby solving the technical problem in the prior art of the writing delay of the external system when using the dual-system to perform writing.

Embodiment 10

An embodiment of the present disclosure provides a storage medium, and the storage medium includes a stored program, wherein, when the program is running, the apparatus where the storage medium is located is controlled to perform the steps that: the first system and the second system receive touch data, wherein the data rendering speed of the first system is faster than that of the second system, and the data processing speed of the second system is faster than that of the first system; the first system acquires data to be rendered from a target storage area, wherein the data to be rendered is generated by the second system according to the touch data and stored in the target storage area; and the first system renders the data to be rendered to obtain handwriting data to be displayed, and transmits the handwriting data to be displayed to a display screen of the dual-system device for display.

Embodiment 11

An embodiment of the present disclosure provides a processor configured to run a program, where, when the program is running, the processor performs the steps that: the first system and the second system receive touch data, wherein the data rendering speed of the first system is faster than that of the second system, and the data processing speed of the second system is faster than that of the first system; the first system acquires data to be rendered from a target storage area, wherein the data to be rendered is generated by the second system according to the touch data and stored in the target storage area; and the first system renders the data to be rendered to obtain handwriting data to be displayed, and transmits the handwriting data to be displayed to a display screen of the dual-system device for display.

The sequence numbers of the above-mentioned embodiments of the present disclosure are only for description, and do not represent the superiority of the embodiments.

In the above-mentioned embodiments of the present disclosure, the description of each embodiment has its own focus. For parts that are not described in detail in an embodiment, reference may be made to related descriptions of other embodiments.

The units described as separate components may or may not be physically separated, and the components displayed as units may or may not be physical units, that is, they may be located in one place, or may also be distributed on multiple units. Some or all of the units may be selected according to actual needs to achieve the objectives of the solutions of the embodiments.

In addition, the functional units in each embodiment of the present disclosure may be integrated into one processing unit, or each unit may exist alone physically, or two or more units may be integrated into one unit. The above-mentioned integrated unit can be realized in the form of hardware or software functional unit.

If the integrated unit is implemented in the form of a software functional unit, and is sold or used as an independent product, it can be stored in a computer readable storage medium. Based on this understanding, the technical solution of the present disclosure essentially or the part that contributes to the prior art, or all or part of the technical solution can be embodied in the form of a software product. The computer software product is stored in a storage medium, and includes a number of instructions to make a computer device (which can be a personal computer, a server, or a network device, etc.) execute all or part of the steps of the method described in each embodiment of the present disclosure. The above-mentioned storage media includes: U disk, read-only memory (ROM), random access memory (RAM), mobile hard disk, magnetic disk or optical disk and other media that can store program code.

The above are only the preferred embodiments of the present disclosure. It should be pointed out that for those skilled in the art, without departing from the principle of the present disclosure, several improvements and modifications can be made, and these improvements and modifications should be also regarded as the claimed scope of the present disclosure.

INDUSTRIAL APPLICABILITY

As described above, the dual-system device and writing method and apparatus thereof, and interactive intelligent tablet provided by at least some embodiments of the present disclosure have the following beneficial effects: the system of the device itself is used to render the data to be rendered drawn by the external system without encoding and decoding the rendered frame, so as to reduce the delay of displaying the data to be rendered of the external system, thereby solving the technical problem in the prior art of the writing delay of the external system when using the dual-system to perform writing.

What is claimed is:

1. A handwriting method for a dual-system device, wherein the dual-system device comprises a first system and a second system that is communicatively coupled by an external channel to the first system, the method comprising:
receiving, by the first system, touch data and transferring the touch data using the external channel to the second system, wherein the second system generates data to be rendered according to the touch data, and stores the data to be rendered in a target storage area, wherein the second system stores information specifying an update area where update content in the data to be rendered is located in the target storage area;
acquiring, by the first system, the data to be rendered from the target storage area, wherein acquiring the data to be rendered from the target storage area further comprises:
monitoring a change of content in the target storage area;
reading the information of update area in the target storage area; and
reading the data to be rendered of the corresponding area from the target storage area according to the information of update area;
rendering, by the first system, the data to be rendered to obtain handwriting data to be displayed, wherein rendering the data to be rendered to obtain handwriting data to be displayed comprises:
determining a corresponding target rendering area in the first system according to the information of update area; and
rendering the target rendering area according to the read data to be rendered to obtain the handwriting data to be displayed; and
transmitting, by the first system, the handwriting data to be displayed to a display screen of the dual-system device for display.

2. The method according to claim 1, wherein a first rendered image frame corresponding to the first system and a second rendered image frame corresponding to the second system are displayed on the display screen, wherein the first rendered frame corresponding to the first system comprises a blank area, the second rendered frame corresponding to the second system is displayed in the blank area, and the touch data is generated by a touch screen of the dual-system device directed to the blank area,
wherein transmitting the handwriting data to be displayed to the display screen of the dual-system device for display comprises:
transmitting the handwriting data to be displayed to the display screen of the dual-system device, and
displaying the handwriting data to be displayed in the blank area.

3. The method according to claim 1, wherein before the first system receives touch data, the second system starts a writing application, wherein the writing application is to acquire the touch data and generate the data to be rendered according to the touch data,
after the second system starts the writing application, the second system triggers the first system to start a rendering application, and
the first system starts the rendering application according to a trigger provided by the second system, wherein the rendering application is to render the data to be rendered to obtain handwriting data to be displayed.

4. The method according to claim 1, wherein while the second system generates the data to be rendered according to the touch data, and stores the data to be rendered in a target storage area.

5. The method according to claim 4, wherein the information specifying the update area includes: information on the upper end, the bottom end, the left end, and the right end of an outer rectangular frame of the update content in the data to be rendered.

6. The method according to claim 1, wherein the first system is an Android system, and the second system is one of a Windows system, an Android system, a Mac OS, or a Linux system.

7. The method according to claim 1, wherein the dual-system device includes a first module and a second module, the first system runs on the first module, and the second system runs on the second module.

8. An interactive intelligent tablet, comprising a touch screen, a display screen, a first module, a second module and a target storage area, wherein
the first module is respectively connected to the touch screen, the display screen, the second module and the target storage area, and the second module is respectively connected to the display screen and the target storage area; a first system runs on the first module, and a second system runs on the second module, wherein the second system is communicatively coupled by an external channel to the first system;

the display screen is to display a first rendered image frame corresponding to the first system and a second rendered image frame corresponding to the second system, and the first rendered image frame corresponding to the first system includes a blank area, and the second rendered image frame corresponding to the second system is displayed in the blank area;

the first system is to receive touch data generated by a touch screen and transfer touch data generated in the corresponding blank area using the external channel to the second system, wherein the second system is to generate data to be rendered according to the touch data transferred by the first system, and store the data to be rendered in a target storage area, and the second system is to store the data to be rendered generated in the target area, and wherein the second system stores information specifying an update area where update content in the data to be rendered is located in the target storage area;

the first system is further to:
  acquire the data to be rendered from the target storage area, wherein to acquire the data to be rendered from the target storage area, the first system is further to:
    monitoring a change of content in the target storage area;
    reading the information of update area in the target storage area; and
    reading the data to be rendered of the corresponding area from the target storage area according to the information of update area;
  render the data to be rendered to obtain the handwriting data to be displayed, wherein to render the data to be rendered to obtain the handwriting data to be displayed, the first system is further to:
    determining a corresponding target rendering area in the first system according to the information of update area; and
    rendering the target rendering area according to the read data to be rendered to obtain the handwriting data to be displayed; and
    transmit the handwriting data to be displayed to the display screen for display.

9. The interactive intelligent tablet according to claim 8, wherein the interactive intelligent tablet further comprises the external channel, and the second module is connected to the first module through the external channel.

10. The interactive intelligent tablet according to claim 8, wherein the update area is where update content in the data to be rendered of the second system located;
  the target storage area includes a first file and a second file, the first file is to store the data to be rendered generated by the second system, and the second file is to store the information specifying the update area generated by the second system.

11. The interactive intelligent tablet according to claim 8, wherein a writing application is installed in the second system, and the writing application is to acquire the touch data and generate the data to be rendered according to the touch data;
  a rendering application is installed in the first system, and the rendering application is to render the data to be rendered to obtain handwriting data to be displayed.

12. The interactive intelligent tablet according to claim 10, wherein the information of update area includes: information on the upper end, the bottom end, the left end, and the right end of an outer rectangular frame of the update content in the data to be rendered.

13. The interactive intelligent tablet according to claim 8, wherein the first system is an Android system, and the second system is one of a Windows system, an Android system, a Mac OS, or a Linux system.

14. The interactive intelligent tablet according to claim 8, wherein the target storage area is a shared disk of a dual-system device.

* * * * *